(12) United States Patent
Nishimura (10) Patent No.: US 6,456,033 B1
(45) Date of Patent: Sep. 24, 2002

(54) POLE CHANGE INDUCTION MOTOR (75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/711,091

(22) Filed: Nov. 14, 2000

(30) Foreign Application Priority Data

May 18, 2000 (JP) ........................................ 2000-146766

(51) Int. Cl.⁷ ............................. H02K 17/14; H02P 5/41
(52) U.S. Cl. ........................................ 318/773; 318/772
(58) Field of Search ............................... 318/772–777, 318/801, 800, 802

(56) References Cited

U.S. PATENT DOCUMENTS

| | | | | |
|---|---|---|---|---|
| 4,489,265 A | * | 12/1984 | Kuznetsov | 318/773 |
| 5,107,435 A | * | 4/1992 | Yamada | 364/474.22 |
| 6,008,616 A | * | 12/1999 | Nagayama et al. | 318/773 |
| 6,066,935 A | * | 5/2000 | Eisele | 318/773 |

FOREIGN PATENT DOCUMENTS

| | | |
|---|---|---|
| JP | 07-033342 | 2/1995 |
| JP | 07-336971 | 12/1995 |
| JP | 7-336971 | 12/1995 |

OTHER PUBLICATIONS

Osama et al., *A New Inverter Control Scheme for Induction Motor Drives Requiring Wide Speed Range*, IEEE Transactions on Industry Applications, vol. 32, No. 4, Jul./Aug. 1996, pp. 938–944.

Vorndran, *Polumschaltung von Asynchronmotoren (I)* [*Pole change of Induction Motors*], Antriebstenichnik, 1981, No. 17, pp. 1156–1159.

* cited by examiner

*Primary Examiner*—Bentsu Ro
(74) *Attorney, Agent, or Firm*—Sughure Mion, PLLC (57) ABSTRACT

The present invention provides a pole change induction motor that can obtain an arbitrary ratio between the numbers of poles and that can select an arbitrary number of turns to thereby obtain a very wide operating range and stabilize an operation when the number of poles is changed. This pole change induction motor comprises a rotor having a squirrel-cage winding, a stator having at least a set of a 2n-pole first winding and a 2m-pole second winding wound around the same stator core, a first inverter connected to the first winding, and a second inverter connected to the second winding.

11 Claims, 6 Drawing Sheets

HIGH SPEED (FOUR-POLE) CONNECTION

FIG. 6B
PRIOR ART

LOW SPEED (EIGHT-POLE) CONNECTION

POLE CHANGE INDUCTION MOTOR

BACKGROUND OF THE INVENTION

1. Field of the Invention

The present invention generally relates to a pole change induction motor adapted to change the number of poles thereof when the speed thereof is changed between a high speed and a low speed, and, more particularly, to a pole change induction motor adapted so that an operating range is wide and that an operation thereof is stable when the number of poles thereof is changed.

2. Description of the Related Art

Figure 6A:
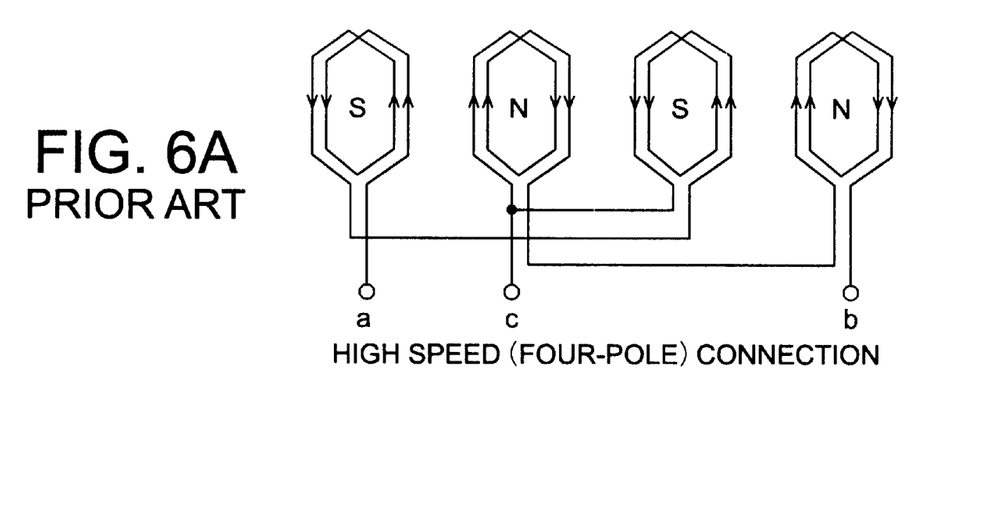
FIGS. 6A and 6B are diagrams illustrating a method of changing the number of poles of a squirrel-cage motor.
Figure 6B:
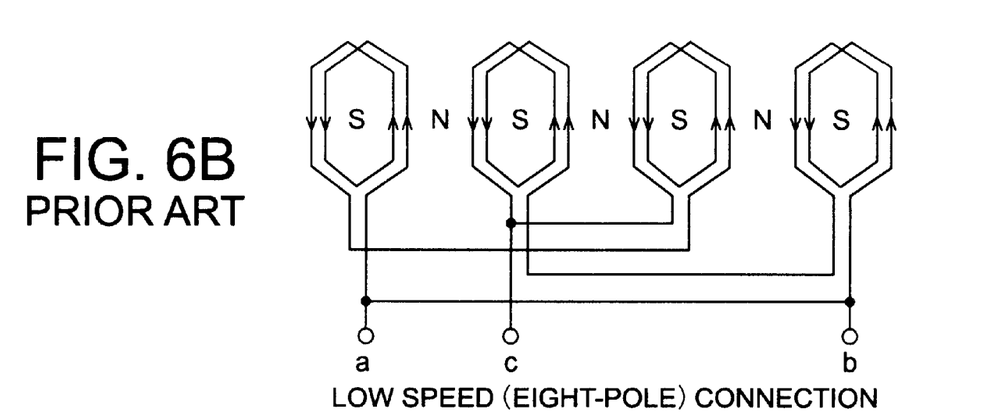

FIGS. 6A and 6B are diagrams illustrating a method of changing the number of poles of a squirrel-cage motor. In the case of a squirrel-cage motor, the number of poles thereof is determined by the number of stator poles thereof. Hitherto, there has been a conventional method of changing the number of poles of the squirrel-cage motor, by which different numbers of poles are obtained by changing the connection on the same winding provided in a stator.

The squirrel-cage motor illustrated in FIG. 6 has four coils consecutively provided in the stator. When the speed of the motor is high, the four coils are excited so that. adjacent coils are different poles. That is, as shown in FIG. 6A, the four coils are excited in such a way as to provide N, S, N and S poles from the left-hand side, as viewed in this figure. Consequently, the motor is now a four-pole motor.

On the other hand, when the speed of the motor is low, the four coils are excited so that all of the coils are the same pole, as illustrated in FIG. 6B. Further, at that time, each S pole is virtually formed between adjacent two N poles. Consequently, the motor is now an eight-pole motor.

Further, for example, Japanese Unexamined Patent Application Publication No. 7-336971 official gazette describes that a first inverter to be connected to a pole unchangeable winding group and a second inverter to be connected to a pole changeable winding group are provided in a squirrel-cage motor configured as described above. Moreover, this official gazette discloses that this motor is configured as an eight-pole motor by causing the first inverter and the second inverter to generate output signals of the same phase, and that a four-electrode motor is obtained by reversing the phase of the output signal only of the first inverter.

In the case of the pole change induction motor of such a configuration, when the speed of the motor is low, high torque is obtained by a small current by increasing the number of poles, whereas when the speed of the motor is high, output power is obtained by reducing the number of poles.

However, in the case of the pole change induction motor of such a configuration, there is a fear that an operation thereof is unstable when the number of pole is frequently changed, because the number of poles is changed by synthesizing a voltage from two kinds of voltages and gradually changing the frequency thereof.

In the case of the conventional pole change induction motor of such a configuration, different numbers of poles are obtained by changing the connection on the same winding. Thus, the number of poles can be changed only when the ratio between the number of poles in the case of the low speed to that of poles in the case of the high speed is 1:2. Further, because the motor has the s am e turn ratio, the voltage utilization factor can be merely doubled. Moreover, as described above, there is a fear that an operation of the motor becomes unstable when the revolution speed thereof frequently changes.

This invention is accomplished to eliminate the aforementioned drawbacks of the conventional pole change induction motor.

SUMMARY OF THE INVENTION

Accordingly, an object of the present invention is to provide a pole change induction motor that can obtain an arbitrary ratio between the numbers of poles and that can select an arbitrary number of turns thereby to obtain a very wide operating range and stabilize an operation when the number of poles is changed.

To achieve the foregoing object, according to the present invention, there is provided a pole change induction motor that comprises a rotor having a squirrel-cage winding, a stator having at least a set of a 2n-pole first winding and a 2m-pole second winding wound around the same stator core, a first inverter connected to the first winding, and a second inverter connected to the second winding. Thus, the motor can operate in a wide operating range by a small current.

Further, the numbers "m" and "n" may be set so that m=2kn. Incidentally, the coefficient "k" is a natural number. This prevents an occurrence of interference due to the combination of the numbers of poles.

Moreover, the number of turns of the first winding may differ from that of turns of the second winding. Thus, the motor can operate in a wide operating range.

Furthermore, the pole change induction motor may further comprise revolution speed detection means for detecting the revolution speed of the rotor, first-inverter control means for controlling the first inverter according to the revolution speed, and second-inverter control means for controlling the second inverter according to the revolution speed. Thus, minute control of individual windings can be conducted. Consequently, the efficiency of the motor can be enhanced.

Additionally, the motor may further comprise torque distribution means for receiving torque commands, and for distributing the torque commands into first torque commands to be outputted to the first inverter, and second torque commands to be outputted to the second inverter. Thus, an easy-to-use motor is realized by distribution of torque generation. Moreover, the efficiency of the motor can be enhanced still more.

Further, the torque distribution means may determine a torque distribution ratio according to the revolution speed represented by data that is outputted by the revolution speed detection means. Therefore, a torque distribution ratio can be determined by an easy method. Consequently, the cost of the motor can be reduced.

Moreover, the torque distribution means may be adapted to distribute the torque commands so that the torque commanded by the second torque command, which is distributed to the second inverter, is higher than the torque commanded by the first torque command, which is distributed to the first inverter, when the revolution speed is equal to or lower than a predetermined value, and that the torque commanded by the first torque command is higher than the torque commanded by the second torque command when the revolution speed is equal to or higher than the predetermined value. Thus, a torque distribution ratio can be determined by an easy method. Consequently, the cost of the motor can be reduced still more.

Furthermore, the torque distribution means may be adapted to first assign the torque commands to the winding having a larger number of poles and then assign a shortage of the torque commands to the winding having a smaller number of poles. Thus, the torque commands can be suitably distributed by performing a simple operation.

Additionally, the first winding and the second winding may be wound and fit into the same slot. This prevents the strength of teeth from being degraded owing to increase in the number of slots. Furthermore, this eliminates a drawback that overlapped coil ends hinder the winding of coils.

Further, when the numbers "m" and "n" are set so that n>m, the 2m-pole second winding may be placed at the opening portion side of the slot. Thus, the skin effect occurring during a high speed operation of the motor can be reduced (that is, the reactance thereof is reduced). Consequently, the efficiency thereof is enhanced. Furthermore, the voltage utilization factor thereof is improved. Thus, a higher speed operation thereof is realized.

Moreover, a section of the 2n-pole first winding in the slot may differ from a section of the 2m-pole second winding therein. Thus, excess materials can be removed. Further, the size of the motor can be reduced.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Hereinafter, the preferred embodiments of the present invention will be described in detail by referring to the accompanying drawings.

First Embodiment

Figure 1:
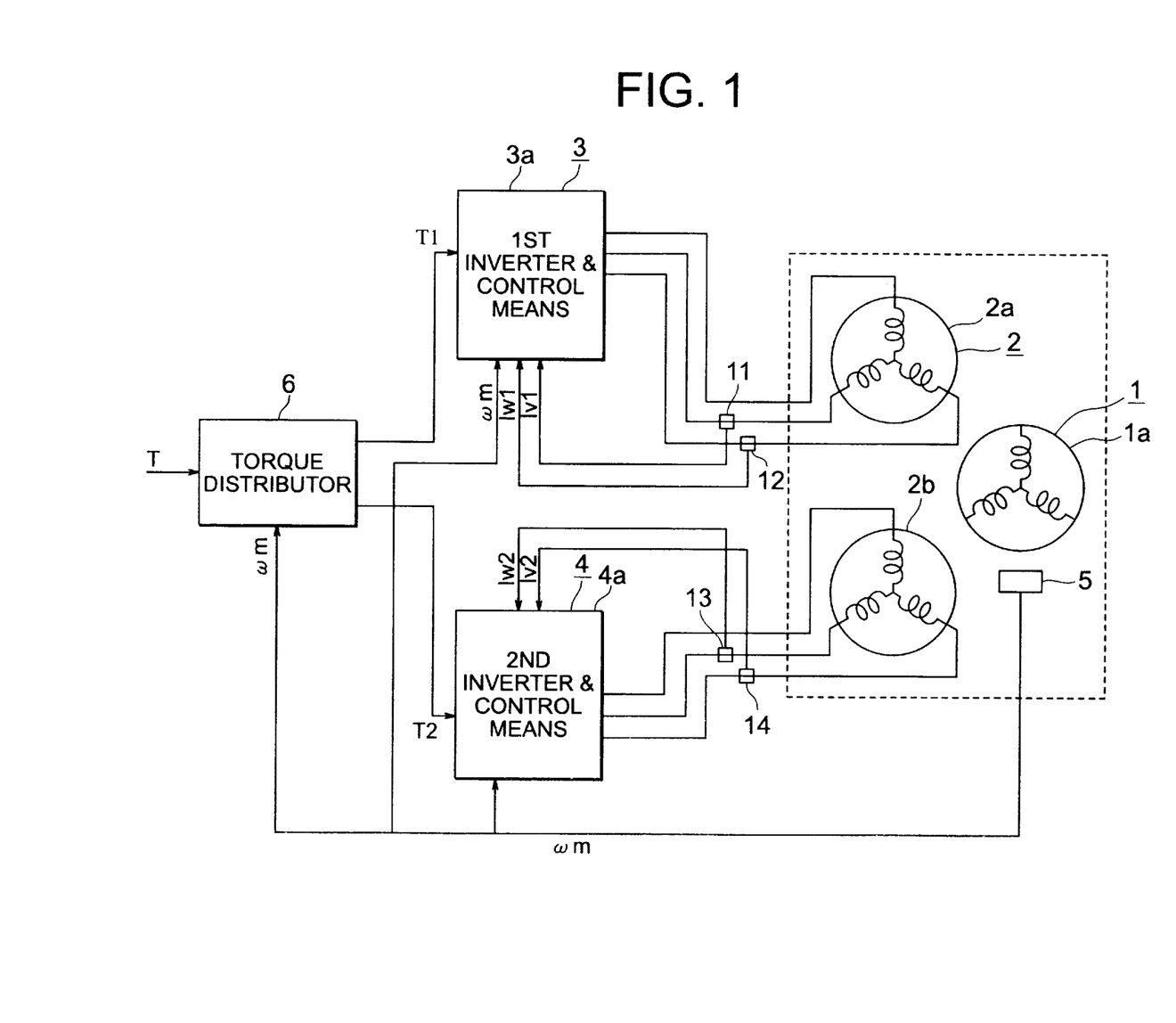
FIG. 1 is a block diagram illustrating a pole change induction motor of the present invention.
Figure 2:
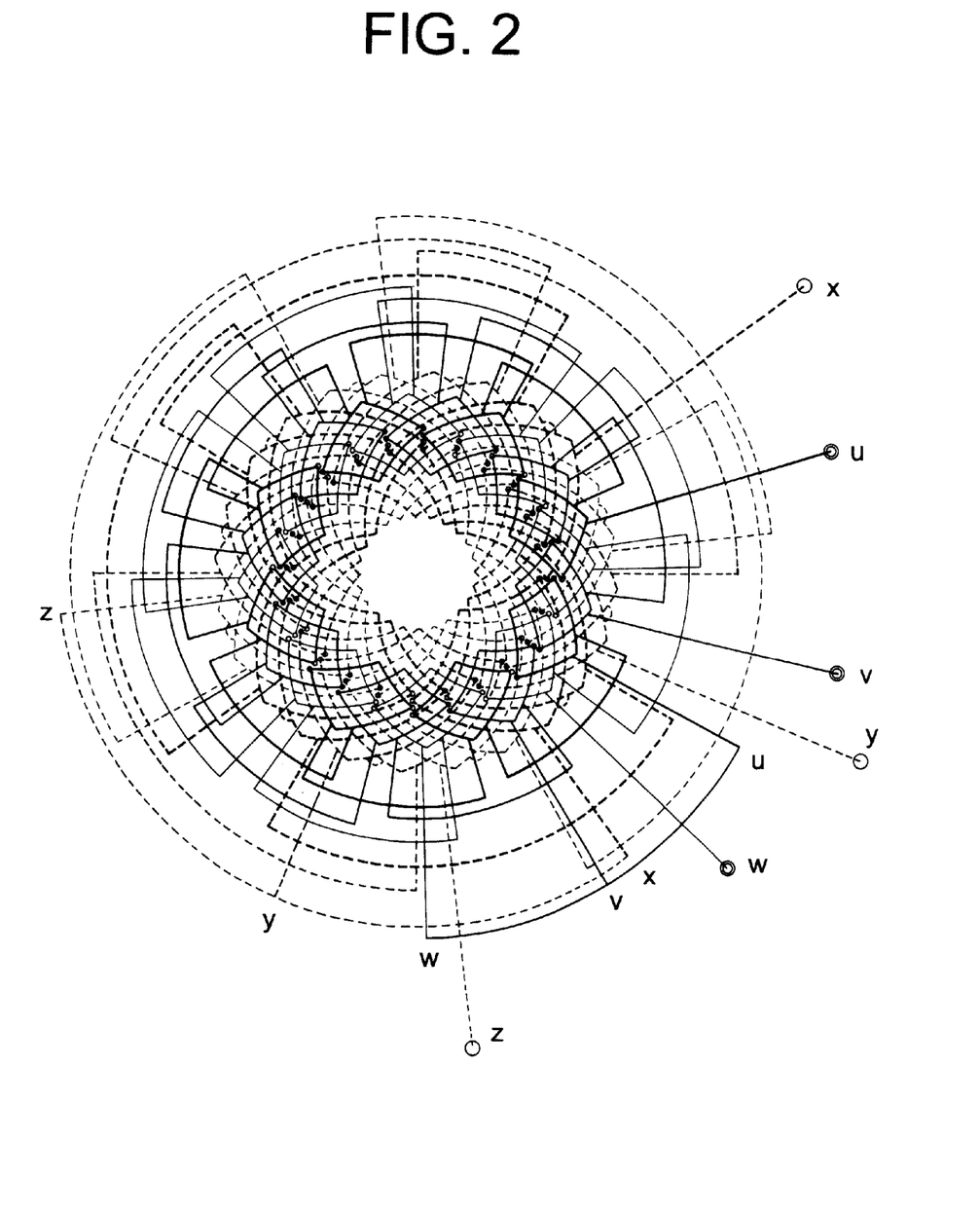
FIG. 2 is a diagram illustrating a manner in which two windings respectively having different numbers of poles, that is, a four-pole winding and an eight-pole winding are provided in a stator thereof.

FIG. 1 is a block diagram illustrating a pole change induction motor of the present invention. FIG. 2 is a diagram illustrating a manner in which two windings respectively having different numbers of poles, that is, a four-pole winding and an eight-pole winding are provided in a stator thereof. In FIG. 1, reference numeral 1 designates a rotor having a squirrel-cage winding 1a. Reference numeral 2 denotes a stator having a four-pole first winding 2a and an eight-pole second winding 2b. In this embodiment, the number of turns of the eight-pole second winding 2b is set in such a manner as to be larger than that of turns of the four-pole first winding 2a. In FIG. 2, reference characters U, V, and W designate terminals corresponding to three phases of the eight-pole second winding 2b, and X, Y, and Z denote terminals corresponding to three phases of the four-pole first winding 2a.

Referring back to FIG. 1, reference numeral 3 designates a first inverter used for excitation of the four-pole winding and thus connected to the first winding 2a. The first inverter 3 contains a first inverter control means 3a. On the other hand, reference numeral 4 designates a second inverter used for excitation of the eight-pole winding and thus connected to the second winding 2b. The second inverter 4 contains a second inverter control means 4a.

Further, reference numeral 5 designates a revolution speed sensor serving as a revolution speed detection means for detecting the revolution speed of the rotor 1. Moreover, reference numeral 6 denotes a torque command distributor serving as a torque distribution means for distributing torque commands according to a revolution speed.

Furthermore, reference numeral 11 designates a first current sensor connected to a V-phase of the first winding 2a and used for detecting a V-phase current flowing through the first winding 2a. Reference numeral 12 denotes a second current sensor connected to a W-phase of the first winding 2a and used for detecting a W-phase current flowing therethrough. Similarly, reference numeral 13 designates a third current sensor connected to a V-phase of the second winding 2b and used for detecting a V-phase current of the second winding 2b. Reference numeral 14 denotes a fourth current sensor connected to a W-phase of the second winding 2b and used for detecting a W-phase current of the second winding 2b.

A signal representing a revolution speed ωm of the rotor 1, which is detected by the revolution speed sensor 5, is inputted to the first inverter control means 3a, the second inverter control means 4a, and the torque command distributor 6. A signal representing electric current Iw1 detected by the first current sensor 11, and a signal representing electric current Iv1 detected by the second current sensor 12 are inputted to the first inverter control means 3a. Further, a signal representing electric current Iw2 detected by the third current sensor 13, and a signal representing electric current Iv2 detected by the fourth current sensor 14 are inputted to the second inverter control means 4a.

Moreover, the torque command distributor 6 is operative to receive torque commands T, and to distribute the inputted torque commands T into the first torque commands T1 to be outputted to the first inverter 3, and into the second torque commands T2 to be outputted to the second torque commands T2.

Next, an operation of this embodiment will be described hereinbelow. When the revolution speed is low, the torque command distributor 6 outputs the torque command T2 according to the revolution speed ωm so that the motor is driven by the eight-pole second winding 2b. The second winding 2b has eight poles, so that the frequency becomes high. Thus, even when the magnetic flux is low, the electromotive force becomes high for the high frequency. Moreover, the number of turns of the second winding is large, so that high torque is generated by a small current. However, in the case that the motor continues to perform high-speed revolution, the electromotive force becomes too high. Thus, output power thereof becomes low.

Then, when the revolution speed becomes high, the torque command distributor 6 outputs a torque command TI according to the revolution speed ωm so that the motor is driven only by the four-pole first winding 2a. The first winding 2a has four poles, so that this winding is excited at a low frequency even when the revolution speed becomes high. Further, even when the magnetic flux is high, the electromotive force can be reduced to a low level because of the low frequency. Furthermore, a large current can be supplied therethrough because of a low counter-electromotive force.

A signal representing the revolution speed ωm may be fed back to the torque command distributor 6. Further, the torque command distributor 6 may change the distribution ratio according to this revolution speed ωm. Furthermore, the distributor 6 may change the distribution ratio at a predetermined value. In the case of this embodiment, the windings differ from each other in the number of poles. Thus, the magnetic fluxes respectively caused by the electric currents flowing through the windings do not interfere with each other. Therefore, the motor can be used as if two motors were driven independently of each other. The first winding 2a and the second winding 2b may be simultaneously driven. Alternatively, the motor may be adapted so that only one of the windings 2a and 2b is operated at once. The way of operating the motor is changed only by altering the distribution method to be performed by the torque command distributor. The four-pole first winding 2a may be used for generating electric power.

Figure 3:
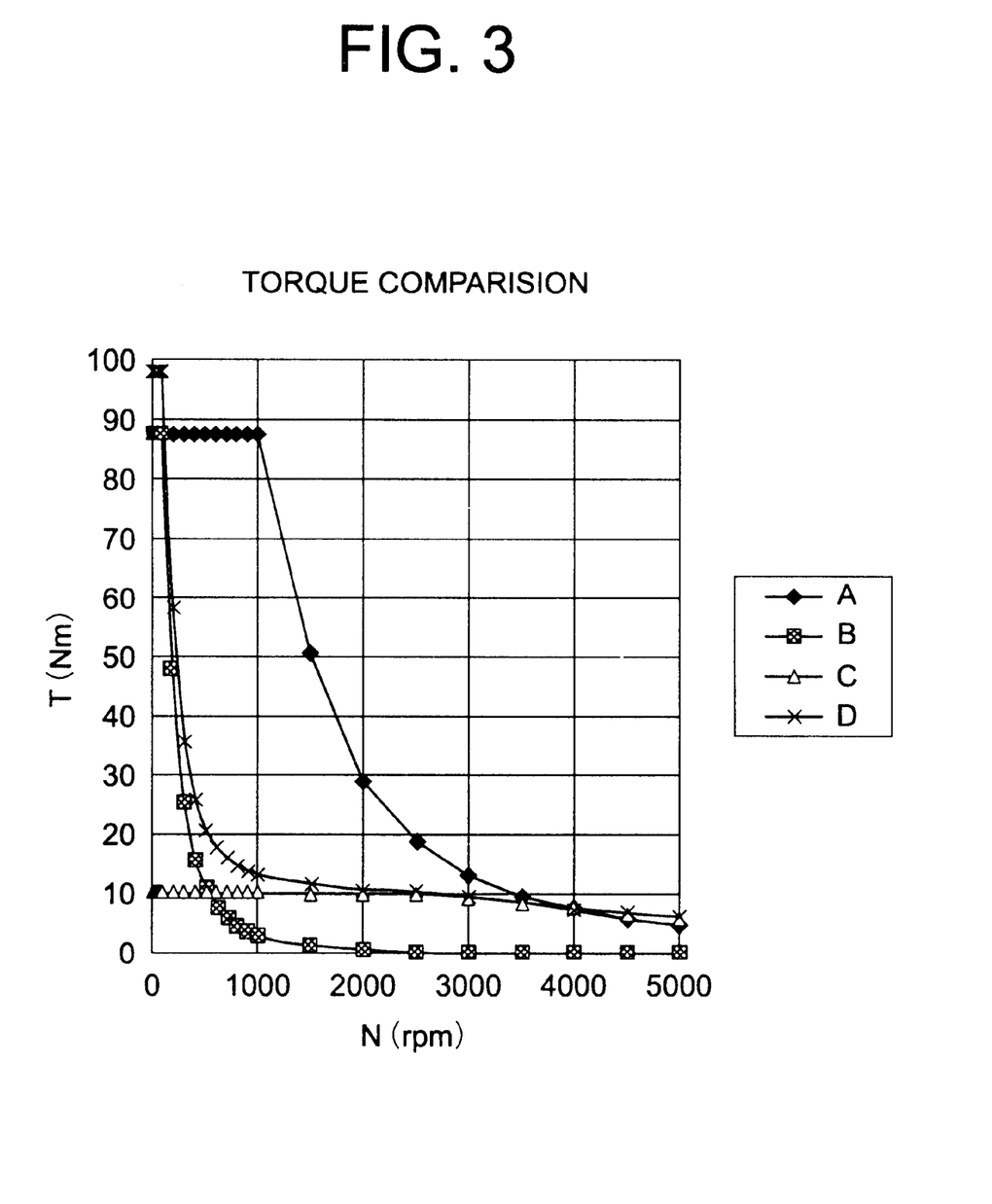
FIG. 3 is a graph for comparing the torque of the motor of the present invention with that of a conventional motor.

FIG. 3 is a graph for comparing the torque of the motor of this embodiment with that of what is called a conventional single-winding single-inverter motor. In FIG. 3, ordinates represent torque (Nm), and abscissas represent a speed of rotation N (rpm). In FIG. 3, a curve A indicates change in the torque of a single-winding single-inverter motor (16 Vrms, 900 Arms), which does not change the number of poles.

A curve B represents change in the torque of a winding having a larger number of poles (namely, eight-pole winding) of what is called a two-winding two-inverter motor (16 Vrms, 150 Arms×2). A curve C represents change in the torque of a winding having a smaller number of poles (namely, four-pole winding) of a two-winding two-inverter motor. A curve D represents change in torque synthesized from output torque of two windings of the two-winding two-inverter motor, that is, change in the torque of the motor that is this embodiment.

As is apparent from FIG. 3, in the case of the winding B having a large number of poles, torque at a very low speed of rotation (that is, at the time of activation) is exceptionally high. However, at a high speed of rotation, the torque is very low. On the other hand, the winding C having a small number of poles generates average torque that is not seriously affected by the speed of rotation.

Further, the motor according to this embodiment obtained by synthesizing these has good characteristics, according to which exceptionally high torque is obtained when the speed of rotation is very low (that is, when the motor is activated), and to which relatively high torque (that is, higher than that the torque of the conventional single-winding single-inverter motor) is obtained when the speed of rotation thereof is high (namely, equal to or higher than 4000 rpm).

Moreover, in the case that the speed of rotation is in the remaining region, the single-winding single-inverter motor obtains higher torque. Actually, in the case of the speed of rotation in this region, such high torque is unnecessary. On the other hand, the current capacity of the single-winding single-inverter motor is 900 Arms, while the current capacity of the 2-winding 2inverter is 150 Arms×2, namely, 300 Arms, and is one-third the current capacity of the single-winding single-inverter motor.

Figure 4:
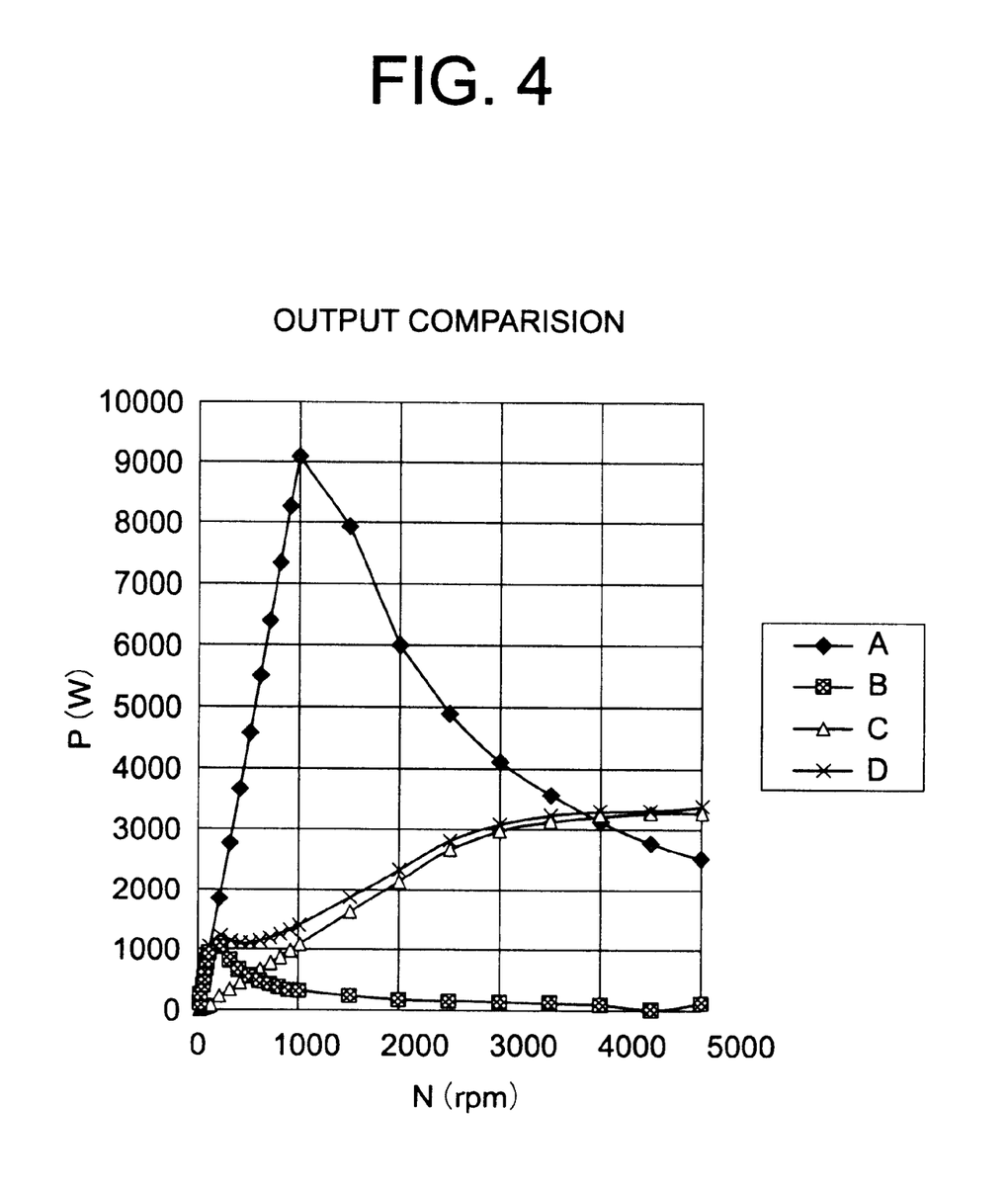
FIG. 4 is a graph for comparing the output power of the motor of the present invention with that of the conventional motor.

FIG. 4 is a graph for comparing the output power of the motor of the present invention with that of the conventional single-winding single-inverter motor. In FIG. 4, ordinates represent output power (W), and abscissas represent a speed of rotation N (rpm). In FIG. 4, curves A to D have the meanings similar to those of the curves A to D in FIG. 3, respectively. As is obvious from FIG. 4, the motor according to this embodiment has sufficient output power at a high speed of rotation (that is, 4000 rpm or more). Incidentally, the conventional single-winding single-inverter motor has very large output power in the vicinity of a speed of rotation of 1000 rpm. However, actually, the output power in the vicinity of this speed of rotation is not so necessary.

That is, as is understood from the comparisons between this embodiment and the conventional single-winding single-inverter motor in FIGS. 3 and 4, to obtain nearly equal torque and output power, this embodiment requires current capacity that is only one-third the current capacity of the conventional motor. Moreover, this embodiment has better characteristics at a low speed of rotation (namely, at the time of activation) and at a high speed of rotation, as compared with those of the conventional motor.

Incidentally, a method of performing an operation of the torque command distributor 6 is not limited to the aforementioned method. Other methods may be employed for performing an operation of the distributor 6. For instance, when a torque command is issued, commanded torque may be assigned to the eight-pole second winding 2b. Further, in the case that torque is insufficient in the second winding 2b, a shortage may be assigned to the four-pole first winding 2a.

Further, a vector control method may be performed as follows. That is, at a low speed of rotation, the motor is driven mainly by the eight-pole second winding 2b according to the torque command. Conversely, at a high speed of rotation, the torque generated by the eight-pole winding is low. Thus, the motor is driven mainly by the first winding 2a.

The four-pole first winding 2a is mainly used at a high speed of rotation. Thus, the torque generated therein is relatively low. Therefore, the necessary number of ampere turns is small. Thus, it is sufficient that the sectional area of the coil (namely, {(the sectional area of the wire)×(the number of turns)}) is small. Practically, the ratio of the sectional area of the eight-pole second wiring 2b to that of the slot may be 70% or so. Further, the ratio of the sectional area of the four-pole first wiring 2a to that of the slot may be 3% or so.

Furthermore, it is sufficient to provide a single revolution speed sensor 5 in the motor. When the number of poles changes, the electrical angular velocity of the rotor 1 varies. However, a desired electrical angular velocity can be obtained by performing multiplication of the number of pole pairs in each of the inverters 3 and 4.

Incidentally, in this embodiment, the torque command distributor 6 serving as the torque distribution means is provided. The torque command distributor, however, is not always necessary for the motor of the present invention. Instead of distributing torque commands, the motor may be. adapted so that two independent torque commands are inputted to the inverters, respectively.

Second Embodiment

Figure 5:
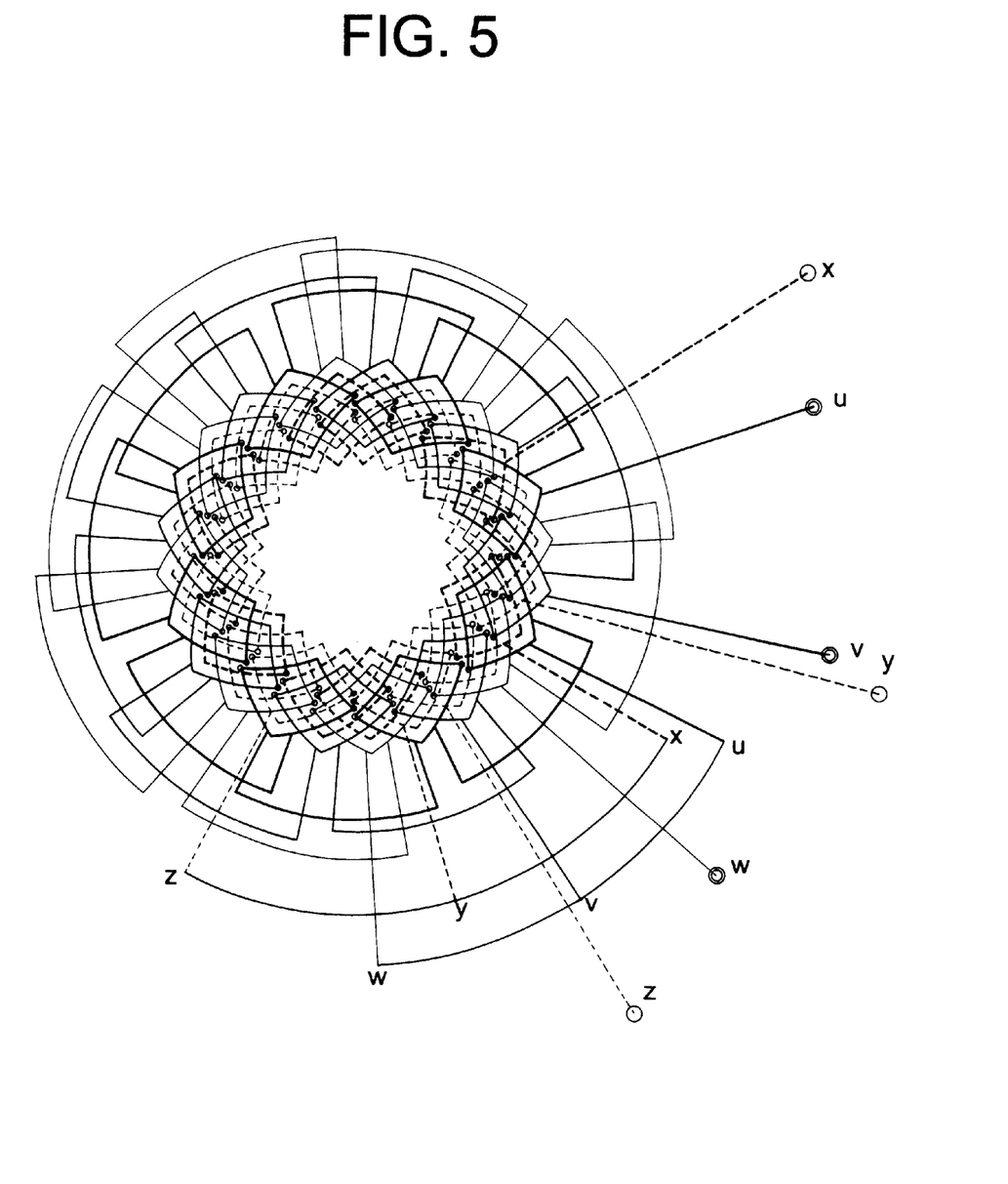
FIG. 5 is a diagram illustrating a manner in which two windings respectively having different numbers of poles, that is, a four-pole winding and an eight-pole winding are provided in a stator of another pole change induction motor embodying the present invention.

FIG. 5 is a diagram illustrating a manner in which two windings respectively having different numbers of poles, that is, a four-pole winding and an eight-pole winding are provided in a stator of another embodiment of the pole change induction motor. The remaining constituent elements of this embodiment are nearly the same as the corresponding elements of the first embodiment. In the case of the second embodiment, when the revolution speed thereof is equal to or less than a predetermined value, the motor is driven by an eight-pole winding, while the motor is driven by a six-pole winding when the revolution speed thereof exceeds the predetermined value. Further, when one of these windings is driven, the other winding is not driven.

In the case that the eight-pole winding and the six-pole winding are wound by using fractional slots, magnetic fluxes partly interfere with each other. Thus, these windings are sometimes difficult to simultaneously drive. However, in the case that one of these windings is not driven and stops working, the motor is easily driven. Although an electromotive force is caused in the winding, which stops working, by part of magnetic fluxes, which interfere with each other, the magnetic fluxes interfering with each other is low, so that the electromotive force is small. When the motor is controlled so that the inverter connected to this winding is turned off, this wiring is clamped to a DC voltage, so that no current flows in this wiring.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A pole change induction motor comprising:

a rotor having a squirrel-cage winding;

a stator having at least a set of a 2n-pole first winding and a 2m-pole second winding that are wound around a same stator core;

a first inverter connected to said first winding; and a second inverter connected to said second winding; wherein n≠m.

2. A pole change induction motor according to claim 1, wherein the numbers "m" and "n" are set so that m =2kn where "k" is a natural number.

3. A pole change induction motor according to claim 1, wherein the number of turns of said first winding differs from that of turns of said second winding.

4. A pole change induction motor according to claim 1, which further comprises:

revolution speed detection means for detecting a revolution speed of said rotor;

first-inverter control means for controlling said first inverter according to the revolution speed; and second-inverter control means for controlling said second inverter according to the revolution speed.

5. A pole change induction motor according to claim 4, which further comprises torque distribution means for receiving torque commands, and for distributing the torque commands into first torque commands to be outputted to said first inverter, and second torque commands to be outputted to said second inverter.

6. A pole change induction motor according to claim 5, wherein said torque distribution means is adapted to determine a torque distribution ratio according to the revolution speed represented by data that is outputted by said revolution speed detection means.

7. A pole change induction motor according to claim 5, wherein said torque distribution means is adapted to distribute the torque commands so that a ratio of the second torque commands, which are distributed to said second inverter, to the first commands is larger than a ratio of the first torque commands to the second commands when the revolution speed is equal to or lower than a predetermined value, and that the ratio of the first torque commands, which are distributed to said first inverter, to the second commands is larger than the ratio of the second torque commands to the first commands when the revolution speed is equal to or higher than a predetermined value.

8. A pole change induction motor according to claim 5, wherein said torque distribution means is adapted to first assign the torque commands to said winding having a larger number of poles and then assign a shortage of the torque commands to said winding having a smaller number of poles.

9. A pole change induction motor according to claim 1, wherein said first winding and said second winding are wound and fit in a same slot.

10. A pole change induction motor according to claim 9, wherein the numbers "m" and "n" are set so that n>m, and wherein said 2m-pole second winding is placed at an opening portion side of the slot.

11. A pole change induction motor according to claim 9, wherein a section of said 2n-pole first winding in the slot differs from a section of said 2m-pole second winding therein.

* * * * *